(12) United States Patent
Larsen et al.

(10) Patent No.: US 12,423,314 B2
(45) Date of Patent: Sep. 23, 2025

(54) INDICATOR INTERPRETATION AND REMOTE MONITORING NETWORK

(71) Applicant: Whammy, Inc., Millbrook, NY (US)

(72) Inventors: Grant Kenji Larsen, Millbrook, NY (US); Andrew Heaney, Millbrook, NY (US)

(73) Assignee: Whammy, Inc., Millbrook, NY (US)

( * ) Notice: Subject to any disclaimer, the term of this patent is extended or adjusted under 35 U.S.C. 154(b) by 0 days.

(21) Appl. No.: 18/154,222

(22) Filed: Jan. 13, 2023

(65) Prior Publication Data
US 2023/0229663 A1    Jul. 20, 2023

Related U.S. Application Data

(60) Provisional application No. 63/299,539, filed on Jan. 14, 2022.

(51) Int. Cl.
*G06F 16/2458* (2019.01)
*G06F 16/182* (2019.01)
(Continued)

(52) U.S. Cl.
CPC ........ *G06F 16/2458* (2019.01); *G06F 16/182* (2019.01); *G06F 16/245* (2019.01);
(Continued)

(58) Field of Classification Search
CPC .... G06F 16/245; G06F 16/2458; G06F 16/27; G06F 16/24537; G06F 16/2455;
(Continued)

(56) References Cited

U.S. PATENT DOCUMENTS

2006/0242285 A1* 10/2006 Moriwaki ............... H04L 67/12
709/223
2010/0271199 A1   10/2010 Belov et al.
(Continued)

FOREIGN PATENT DOCUMENTS

AU    2012244083 A1    11/2012
WO    2023137393 A1     7/2023
(Continued)

OTHER PUBLICATIONS

International Search Report and Written Opinion dated Jun. 14, 2023 cited in Application No. PCT/US23/60580, 11 pgs.
(Continued)

*Primary Examiner* — Shahid A Alam
(74) *Attorney, Agent, or Firm* — BEKIARES ELIEZER LLP (57) ABSTRACT

A system for remote monitoring of an indicator of a device. The system includes a processor of an interpretation module connected to a sensor node and to a user device over a remote network; a memory on which are stored machine-readable instructions that when executed by the processor, cause the processor to: query an admin database for new data acquired from the sensor node, search the admin database for a matching sensor ID, extract from the admin database recent entries corresponding to the sensor ID, determine if the entries indicate a pattern comprising at least one parameter, responsive to a detection of the pattern, search an interpretation database for a matching pattern comprising the parameter, extract interpretation data from an entry comprising the matching pattern, and provide the interpretation data to the user device.

20 Claims, 4 Drawing Sheets

(51) Int. Cl.
*G06F 16/245* (2019.01)
*G06F 16/2453* (2019.01)
*G06F 16/2455* (2019.01)
*G06F 16/27* (2019.01)

(52) U.S. Cl.
CPC .... *G06F 16/24537* (2019.01); *G06F 16/2455* (2019.01); *G06F 16/2462* (2019.01); *G06F 16/278* (2019.01)

(58) Field of Classification Search
CPC ......... G06F 16/24552; G06F 16/24544; G06F 16/2456; G06F 16/182; G06F 16/2462; G06F 16/278; G06F 16/2471
USPC ........................................................ 707/769
See application file for complete search history.

(56) References Cited

U.S. PATENT DOCUMENTS

| | | | |
|---|---|---|---|
| 2015/0059468 A1 | 3/2015 | Humphrey | |
| 2015/0142945 A1 | 5/2015 | Brandt et al. | |
| 2015/0159887 A1* | 6/2015 | Kadah | F23Q 7/24 126/116 A |
| 2016/0092501 A1 | 3/2016 | Chakraborty et al. | |
| 2017/0040520 A1 | 2/2017 | Gillette | |
| 2017/0261264 A1* | 9/2017 | Wang | G06V 20/41 |
| 2017/0357926 A1 | 12/2017 | McSheffrey | |
| 2018/0087948 A1 | 3/2018 | Khandelwal | |
| 2019/0296979 A1 | 9/2019 | Gupta et al. | |
| 2019/0349727 A1 | 11/2019 | Gundel et al. | |
| 2019/0363746 A1 | 11/2019 | Zalewski et al. | |
| 2020/0294694 A1 | 9/2020 | Bertini et al. | |
| 2021/0006623 A1* | 1/2021 | Joao | H04L 67/52 |
| 2021/0116288 A1 | 4/2021 | Rego de Oliveira et al. | |
| 2021/0117300 A1 | 4/2021 | Santhar et al. | |
| 2021/0241556 A1 | 8/2021 | Ruane et al. | |
| 2021/0374391 A1* | 12/2021 | Jorasch | G06V 20/20 |
| 2021/0375115 A1 | 12/2021 | Roy et al. | |
| 2023/0231757 A1 | 7/2023 | Larsen et al. | |
| 2023/0243690 A1 | 8/2023 | Larsen et al. | |

FOREIGN PATENT DOCUMENTS

| | | |
|---|---|---|
| WO | 2023137413 A2 | 7/2023 |
| WO | 2023137424 A2 | 9/2023 |

OTHER PUBLICATIONS

International Search Report and Written Opinion dated Jun. 22, 2023 cited in Application No. PCT/US23/60607, 12 pgs.
International Search Report and Written Opinion dated Jul. 5, 2023 cited in Application No. PCT/US23/60627, 7 pgs.
U.S. Non-Final Office Action dated Mar. 7, 2024 cited in U.S. Appl. No. 18/153,915, 23 pgs.
International Preliminary Report on Patentability dated Jul. 25, 2024 cited in Application No. PCT/US23/60607, 11 pgs.
International Preliminary Report on Patentability dated Jul. 25, 2024 cited in Application No. PCT/US23/60580, 10 pgs.
International Preliminary Report on Patentability dated Jul. 25, 2024 cited in Application No. PCT/US23/60627, 6 pgs.
U.S. Final Office Action dated Jul. 31, 2024 cited in U.S. Appl. No. 18/153,915, 24 pgs.
U.S. Non-Final Office Action dated Dec. 31, 2024 cited in U.S. Appl. No. 18/153,915, 23 pgs.
U.S. Non-Final Office Action dated Jul. 11, 2025 cited in U.S. Appl. No. 18/154,064, 16 pgs.

* cited by examiner

FIG. 1

| Sensor ID | Time | Light State | Light Color | Associated Device ID | Owner Contact |
|---|---|---|---|---|---|
| 1234 | 10:00AM 8/16/21 | On | Red | 546676 | wsmith@gmail.com |
| 1234 | 10:15AM 8/16/21 | Off | N/A | 546676 | wsmith@gmail.com |
| 1229 | 10:15AM 8/16/21 | On | Green | 878451 | gasman@ipcg.com |
| " | " | " | " | " | " |
| " | " | " | " | " | " |

| Device ID | Device Description | Indicator Light Code | Interpretation |
|---|---|---|---|
| 546676 | Furnace | Flame LED, | Heat On |
| 546676 | Furnace | Flame LED, | Heat Off |
| 546676 | Furnace | 3 Blinking Red Lights | Replace Filter |
| 989765 | Water Heater | Green, 2 Rapid Blinks | Normal Status |
| . | . | . | . |
| . | . | . | . |

*FIG. 4*

INDICATOR INTERPRETATION AND REMOTE MONITORING NETWORK

RELATED APPLICATION

Under provisions of 35 U.S.C. § 119 (e), the Applicant claims benefit of U.S. Provisional Application No. 63/299,539 filed on Jan. 14, 2022, and having inventors in common, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF THE DISCLOSURE

The present disclosure is generally related to remote monitoring network infrastructure and more particularly to an indicator monitoring network.

BACKGROUND

Many modern appliances, machines, and systems, such as stovetops, heaters, or even door locks, are not built to be monitored and controlled remotely. Fortunately, some technologies have allowed remote access and control of such devices through wireless networks such as the internet or even local wireless mesh networks in and around a home or other structure.

However, many of these technologies do not work with existing systems, but instead may require a homeowner to upgrade to a "smart appliance." Further, these remote networks often require access to the internet and become difficult to troubleshoot when connectivity is at issue.

For some systems, such as propane tanks, which are often stored far from other systems for safety, a wireless connection may require repeater nodes to extend the signal. When one of these nodes needs replacement or repair, it may be difficult to discern which node is the problem. Technicians may need to access data from other nodes on the local mesh directly and wirelessly.

Some appliances may have a very detailed system of indicator lights that may flash or change color to report the machine's status. But, without integrated communication technology, these indicator lights cannot be read remotely without pointing a remotely accessible camera at the display.

Accordingly, a reliable system for an indicator light monitoring network is desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for remote monitoring of an indicator (e.g., an indicator light, an indicator buzzer, etc.) of a device. The system includes a processor of an interpretation module connected to a sensor node and to a user device over a remote network; a memory storing machine-readable instructions that, when executed by the processor, cause the processor to: query an admin database for new data acquired from the sensor node, search the admin database for a sensor ID associated with the sensor node, extract from the admin database recent entries corresponding to the sensor ID, determine that the entries indicate a pattern comprising a parameter, responsive to a detection of the pattern, search an interpretation database for a matching pattern comprising the parameter, extract interpretation data from an entry comprising the matching pattern, and provide the interpretation data to the user device.

Another embodiment of the present disclosure provides a method that includes steps of querying an admin database for new data acquired from a sensor node, searching the admin database for a sensor ID associated with the sensor node, extracting from the admin database recent entries corresponding to the sensor ID, determining that the entries indicate a pattern comprising a parameter, responsive to a detection of the pattern, searching an interpretation database for a matching pattern comprising the parameter, extracting interpretation data from an entry comprising the matching pattern, and providing the interpretation data to the user device.

Another embodiment of the present disclosure provides a computer-readable medium including instructions for querying an admin database for new data acquired from a sensor node, searching the admin database for a sensor ID associated with the sensor node, extracting from the admin database recent entries corresponding to the sensor ID, determining that the entries indicate a pattern comprising a parameter, responsive to a detection of the pattern, searching an interpretation database for a matching pattern comprising the parameter, extracting interpretation data from an entry comprising the matching pattern, and providing the interpretation data to the user device.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

DESCRIPTIONS OF THE DRAWINGS

The accompanying drawings, which are incorporated in and constitute a part of this disclosure, illustrate various embodiments of the present disclosure. The drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Embodiments of the present disclosure will be described more fully hereinafter with reference to the accompanying drawings in which like numerals represent like elements throughout the several figures and in which example embodiments are shown. Embodiments of the claims may, however, be embodied in many different forms and should not be construed as limited to the embodiments set forth herein. The examples set forth herein are non-limiting examples and are merely examples among other possible examples.

As a preliminary matter, it will readily be understood by one having ordinary skill in the relevant art that the present disclosure has broad utility and application. As should be understood, any embodiment may incorporate only one or a plurality of the disclosed aspects of the disclosure and may further incorporate only one or a plurality of the disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶ 6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of a fluid tank remote monitoring network, embodiments of the present disclosure are not limited to use only in this context.

The disclosed embodiments may be used in any field requiring measurement of a remotely deployed site, whether the site is mobile or stationary. Such measurement may be of a continuous value, such as a battery's voltage or the volume of liquid in a tank. Such measurement may be a discrete value (binary or otherwise), such as the state of an indicator light, the presence or absence of liquid, audio levels above a threshold, or other defined discrete levels that a sensor of any type may be able to report. Some embodiments of the remote monitoring and indicator interpretation network may be used in the field of propane delivery and level maintenance, where the measurement is of continuous values of liquid propane amount and battery voltages of the measurement nodes. Alternatively, embodiments of the remote monitoring and indicator interpretation network may be used in other fluid delivery industries (e.g., fuel oil), and for other maintenance items.

Figure 1:
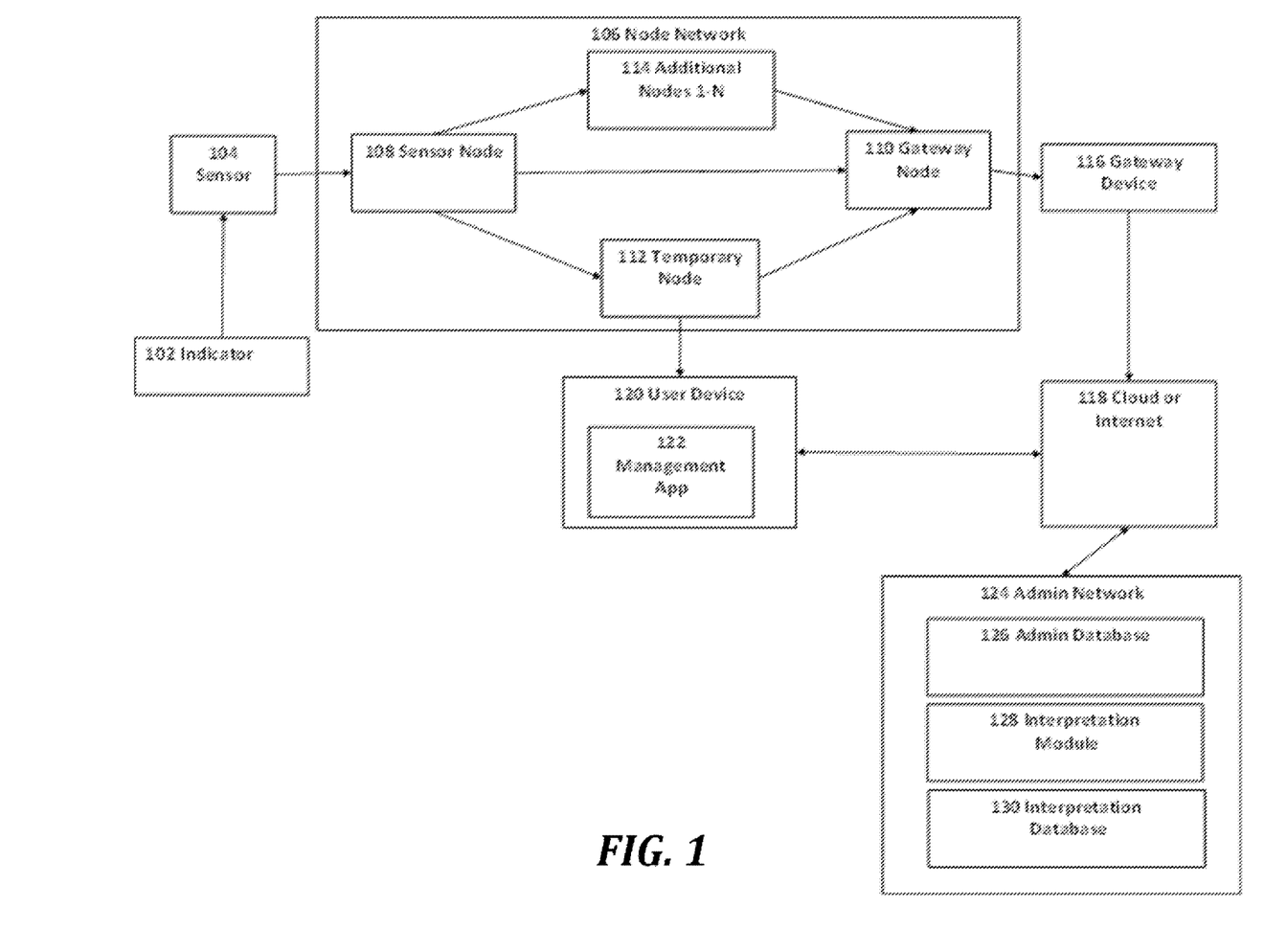
FIG. 1 illustrates a system for remote indicator interpretation, consistent with disclosed embodiments.

FIG. 1 illustrates a system for remote indicator interpretation and monitoring. This system includes an indicator 102, which may be any mechanism that indicates a device's status. The indicator 102 may include one or more of a visual indicator, an audio indicator, a haptic indicator, and/or any other indicator capable of indicating a status of a device to which the indicator is connected. As non-limiting examples, A visual indicator may include (but is not limited to) an indicator light (as shown in FIG. 1), a plurality of indicator lights, a liquid crystal diode (LCD) display screen (e.g., a panel-type display, and/or a multi segment display, such as a seven-segment display), an e-paper display, an e-ink display, or any other visual display of a status indicator; an audio indicator may include (but is not limited to) a speaker, a buzzer, an alarm, a bell, or any other audible indication of a device status; a haptic indicator may include (but is not limited to) a motor for creation of vibrational or other touch-based feedback configured to indicate a status of a device. As a particular example, an oven indicator light which is on when the oven is pre-heating, a smoke detector indicator light which indicates if the smoke detector is functioning or if it needs repair, an indicator light on a water heater that can blink and/or change color based on multiple errors, etc. A sensor 104 may detect at least one parameter of the indicator 102. In embodiments, the sensor 104 may comprise a photoelectric sensor, a camera, a microphone, and/or a sound sensor. The sensor 104 may detect one or more parameters of the indicator 102, such as color, blinking frequency, intensity, volume, pitch, etc.

One or more indicators 102 may comprise a single indicator panel. The sensor 104 may sense multiple indicators (e.g., all indicators on a single indicator panel), or each indicator on a device may have one corresponding sensor 104. The sensor 104 may be connected to a gateway device 116 and/or a user device 124 by a network 106. In some embodiments, the network 106 may be formed as a node network, a hub and spoke network, or any other network architecture suitable for conveying data between the sensor 104 and the gateway device 116 and/or user device 124. In some embodiments, the network may include one or more additional devices, such as a repeater, a bridge, a router, a switch, and/or an extender. Data may be communicated between devices within the network using wired and/or wireless communication methods. For example, network communication may adhere to standards set forth by the institute for electrical and electronic engineers (IEEE) standards in the 802 working group, including IEEE 802.3 ethernet communication standards, 802.11 wireless local area network (WLAN) standards, 802.15 wireless personal area network (e.g., Bluetooth, ZigBee, etc.) standards, and/or the like. In the disclosed embodiments, the network 106, which may be a network of interconnected nodes that transmit data to or from other nodes or other elements of the system such as the sensor 104, the gateway device 116, or the user device 120. Each node may represent, for example, a communication endpoint and/or a redistribution point within the network.

A node may be an electronic device attached to a network and capable of creating, receiving, and/or transmitting information. One or more (e.g., each) of the nodes may be a self-contained wireless communication device that can communicate with other nodes and devices via wireless communication methods such as RFID, NFC, BlueTooth, Wi-Fi, Li-Fi, Radio Frequency (RF) communication, such as binary phase shift keying (BPSK) over ISM band spectra, etc. The nodes in the node network 106 may be contained within other system elements such as the gateway device 116 or sensor 104. Nodes may be contained in a housing, such as a plastic container containing space for the electronics that comprise the node. A node may refer to the electronics that perform the communications or refer to both the electronics and housing. The node network 106 may be comprised of three nodes: a sensor node 108, which is fixed near or at the sensor 104; a gateway node 110, which is fixed near or at the gateway device 116; and a temporary node 112, which is mobile or otherwise temporary.

In some disclosed embodiments, the network 106 may include additional nodes 114 to create a mesh network, a hub and spoke network, a linear topology network, or any other network topology for communicating data among the network nodes, and/or to provide additional network functionality. Some of the additional nodes 114 may be alternate versions of the three nodes discussed above (e.g., the sensor node 108, the gateway node 110, and the temporary node 112). For example, there may be two nodes that are fixed near the sensor 104, both of which may be sensor nodes 108 such that if one node fails, the other node can still transmit data from the sensor 104 to other nodes on the node network 106. Additionally or alternatively, the additional nodes 114 may be intermediate nodes that neither receive data directly from the sensor 104 nor transmit data directly to the gateway device 116, but instead transfer data from one node to another to increase the range of the signal, ensure data integrity, and/or facilitate the integration of the temporary node 112 into the node network 106.

A sensor node 108, may be a node that receives data from the sensor 104. Data may be transmitted to the node via wired or wireless communication from the sensor 104. In some embodiments, the sensor node 108 may be configured to read data from the sensor 104 (e.g., if the sensor is analog and/or produces a visual and/or audible alert). There may be more than one sensor node 108, which node operates as the sensor node 108 may change based on connection strength between the sensor and nodes in the node network 106. The sensor node 108 may be connected to the sensor 104, which may detect a parameter, such as color, pitch, and/or intensity, of the indicator 102. The sensor node 108 may be attached to a support, which allows it to mount to the indicator 102 or the sensor 104. Due to the obstacles and/or obstructions, the sensor node 108 may not be able to directly communicate with the gateway node 110. One or more additional nodes 114 may be placed in a location that allows the one or more additional nodes to relay wireless communications around obstacles and obstructions.

In cases where there are few or no obstacles or obstructions, the gateway node 110 and the sensor node 108 may be the same node. A gateway node 110 may be a node that sends data received from other nodes to the gateway device 116. The gateway device 116 and the gateway node 110 may be the same device, or one may contain the other. The gateway node 110 may transmit data from the node network 106 to the gateway device 116. The gateway node 110 and the gateway device 116 may be adjacent, attached, or contained in the same enclosure. When data is received by the gateway device 116 or the admin network 124, the receiving element may acknowledge receipt, and the gateway node 110 may broadcast this success to all nodes in range. If, for example, the sensor node 108 is out of range, it will still be waiting and may re-try transmission at the next low-power-managed interval. However, an additional node 114 may accept the acknowledgment and relay it to the sensor node 108 at such time as their listening and transmission intervals overlap. This is the normal round trip of measurement data transmission and acknowledgment reception.

When the admin network 124 receives the data from the node network 106, it may simply log these data, or run a trend analysis or other analysis, and may initiate a service action. Such action may include, as a non-limiting example, scheduling a propane delivery because the tank level is low, and other logistical factors contribute to the conclusion to make such delivery. Alternatively, the service action may be more along the lines of network maintenance, such as (if any of the nodes in the node network 106 reported that its battery is low enough to require replacement) scheduling service for a node. Such service may include replacement of the battery or the entire node.

A temporary node 112 may be a node that connects to the node network 106 temporarily to send data to and/or receive data from other nodes. This data may then be passed on to the gateway node 110 or other nodes in the network. The temporary node 112 may be mobile, such that one temporary node could join multiple node networks 106 based on proximity. The temporary node 112 may be able to send data directly to the user device 120 (e.g., when access to the cloud or internet 118 is unavailable). For example, a service technician may carry a temporary node 112 so that the technician can use the temporary node to integrate with any node network 106 and access data without being connected to the cloud or internet 118. The temporary node 112 may be a node that has augmented equipment allowing direct display of network parameters and command functions to the user.

The temporary node 112 may be required for network maintenance, especially if the gateway mechanism is unavailable, rendering the node network 106 "invisible" to a remote system. If the gateway device 116 and internet connectivity is operational, then an alternate method for the service technician to use may include accessing the network information via a user device 120 or a web page associated with the admin network 124 on an internet-connected device. The temporary node 112 may not be ported by the service technician, but may instead be integrated into or otherwise attached to a delivery or service vehicle. Valuable data may be obtained by understanding when this temporary node 112 may have joined a local network and how long it was present. If attached to a delivery vehicle, the temporary node 112 may include one or more measurement modules and may provide data about the transfer from a tank on the vehicle to the user device 120.

Zero or more additional nodes 114 may facilitate the communication of data within the node network 106. For example, if the sensor node 108 is too far from the gateway node 110 to communicate, or there is an obstruction blocking communication, then additional nodes 114 may be used to repeat the signal to help ensure the data from the sensor node 108 reaches the gateway node 110.

A gateway device 116 may be a device that allows for data to be sent through the cloud or internet 118. The gateway device 116 may not be the only device between the node network 106 and the cloud or internet 118. For example, the gateway device 116 may be a modem, or may be a router that sends data to a modem which then sends data to the cloud or internet 118. The cloud or internet 118 may be a wired and/or a wireless network. The network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network (e.g., the cloud or internet 118) may allow ubiquitous access to shared pools of configurable system resources and higher-level services that can be rapidly provisioned with minimal management effort and relies on sharing of resources to achieve coherence and economies of scale, like a public utility. At the same time, third-party clouds enable organizations to focus on their core businesses instead of expending resources on computer infrastructure and maintenance.

A user device 120 may be any device that can receive information from the cloud or internet 118, such as a laptop, smartphone, tablet, computer, or smart speaker. The user device 120 may be a device that can receive or send information to one or more nodes on the node network 106. The user device 120 may be connected to the sensor 104 directly. For example, the user device may be a panel that covers the indicator 102 and directly displays, or otherwise transmits, an interpretation of the information indicated by the indicator 102.

The panel may allow light from the indicator 102 to still be monitored. For example, for an indicator light, the panel may either be partially or fully transparent, or the panel may mimic the indicator 102. The user device 120 may be a self-powered device that reads the indicator 102 data. The data read from the indicator 102 may be sent to the admin network 124, or any other networked device, such as a smartphone, tablet, thermostat UI, etc. The data read from the indicator 102 may be re-rendered on a display of one or more of the networked devices, or the user device 102 itself. For example, a single LED on the indicator 102 may be rendered as a series of four lights that would allow for 16 static status displays. Including blinking patterns in the lights would allow for even more information to be displayed. The data from the indicator 102 may be augmented with new data, or interpretations of new data. Such as the status of related devices, usage data, weather data, news data, etc.

The user device 120 may transmit a status of the indicator 102 via visual representation, sound, haptics, and/or any other method of informing a user of the status of the indicator 102 or the associated device. Other data may be displayed, or otherwise transmitted, with the status of the indicator 102 (e.g., to give context to the status). For example, temperature data, fluid usage data, power consumption data, time-in-use data, software update data, diagnostic data, news data, etc. may be displayed. A management app 122, which may be an application on the user device 120, may display information associated with the indicator 102 obtained from the admin network 124 or directly from the node network 106. The management app 122 may also allow a user or service technician to affect elements of the system. For example, the management app 122 may remotely turn off the device associated with the indicator 102, control the indicator 102 itself, reset the node network 106, etc. The management app 122 may allow a user to receive information from and control the system. The user may be the owner or user of the device associated with the indicator 102, a technician, an agent of a device company, a regulator, etc. The management app 122 may receive data from the admin network 124 if a connection to the network 118 is available.

If a connection between the management app 122 and the admin network 124 is unavailable, the management app 122 may connect directly to the node network 106. Connection to the node network 106 may require proximity to at least one node on the network. This node may be the temporary node 112, which may be part of, or otherwise connected to, the user device 120. For example, the user device may be a smartphone attached via USB-c cable to a temporary node 112. The temporary node 112 may sync up to a nearby node network 106 such that the user device 120 can obtain information from the node network 106 through the connection with the temporary node 112. The user device 120 and temporary node 112 may be the same device or may be housed in the same container. For example, a handheld tablet containing an RFID communication device that can receive data from the node network 106 may serve as the user device 120 and the temporary node 112. The management app 122 may display information from the admin network 124 and/or the node network 106 to the user. The user may be able to navigate through the management app 122 in order to view, format, and filter the data.

The user may be able to make changes to the system using the management app 122. For example, the user may request refueling, reboot a node or the node network 106, control which data is sent to the admin network 124, etc. Additional elements of the system may also be controlled through the management app 122. For example, an emergency shut-off valve controlled remotely may be activated through the management app 122. Management of the system may be automated through the management app 122. For example, when the indicator 102 provides a particular signal (e.g., blinks rapidly), an emergency shut-off valve may be activated without user intervention.

An admin network 124 may be a computer or network of computers that receives data associated with the indicator 102 through the cloud or internet 118. This data may be stored, sent, altered, and/or used in programs or modules. An admin database 126 may contain data received by the admin network 124. The admin database 126 may contain a record of all data received on the indicator 102 over time.

The admin database 126 may contain data from multiple instances of this system. The admin database 126 may also contain data from other sources such as weather data, data from manufacturers of the indicator 102, data provided by a system user, etc. An interpretation module 128, which may interpret the data from the sensor 104 based on known interpretations of the data in the interpretation database 130. The interpretation module 128 may send the interpretation of the data to the user device 120. For example, a flame on indicator LED on a furnace may indicate that the furnace is on and heating. The interpretation module 128 may receive data that the indicator LED is on, determine (based on data in the interpretation database 130) that the lit LED indicates the furnace is on and heating, and send a notification to the user device 120 that the furnace is on and heating. In another example, the indicator LED may be placed on a water heater, a stovetop or a door lock.

In some embodiments, the interpretation module 128 and/or the interpretation database 130 may reside on the user device 120 in addition to or in place of being hosted on the admin network 124. When connection through the cloud or internet 118 is unavailable, the interpretation module 128 or a similar module may run on the user device 120 with data directly from the node network 106. An output display, which may be the display of the user device 120, a display attached to the sensor 104, a display connected to the admin network 124, etc., may mimic the indicator data captured by the sensor so a user can see the indicator status.

The interpretation database 130 may contain known interpretations of indicator 102 statuses (e.g., colors, patterns, pitches, etc. produced by the indicator). For example, when an indicator light on a clothes dryer is red, that may be interpreted as an error to complete the drying cycle. When the indicator light is green, it may be interpreted as completion of the drying cycle, and when the indicator light is blinking yellow, it may be interpreted as a warning that the door to the dryer is not closed properly. The interpretation database 130 may be populated with interpretations from the manufacturer of the device, user-identified interpretations, administrator-identified interpretations, interpretations created based on a machine learning process, any other method of interpreting patterns produced by the indicator 102, or any combination thereof. When connection through the cloud or internet 118 is unavailable, the interpreter database 130, or a subset of the data therein, may be stored on the user device 120 or another location that can be accessed through the node network 106.

Functioning of the Admin Database 126 will now be explained with reference to FIG. 2.

Figure 2:
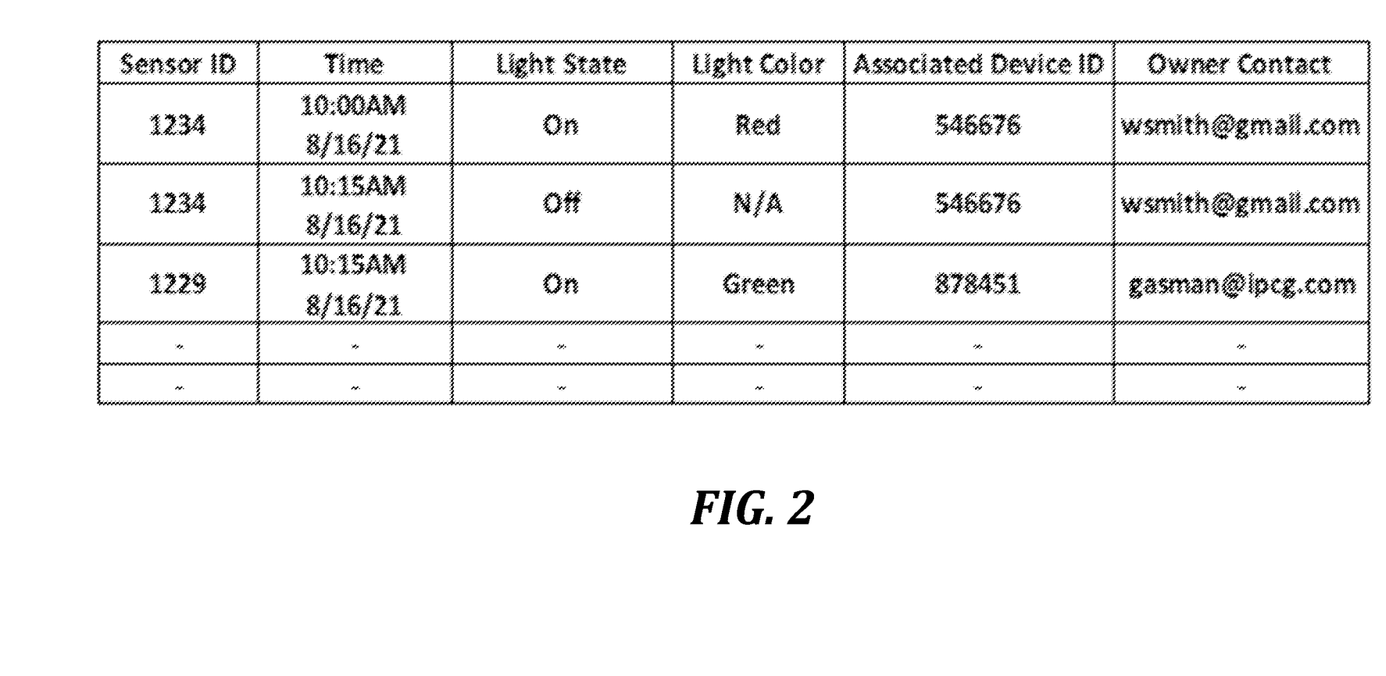
FIG. 2 illustrates an Admin Database, consistent with disclosed embodiments.

FIG. 2 shows an embodiment of the Admin Database 126. The admin database 126 may contain identifying information for an indicator 102. For example, a sensor ID, a device ID of the device the indicator 102 is part of or is associated with, and contact information for the owner or manager of a device. The admin database 126 may also contain the data received about the state of the indicator 102. This data may be timestamped and may be saved in the database continuously, at regular intervals such as, but not limited to, every minute, every 5 minutes, every 15 minutes, every hour, etc., or at irregular intervals based on measured, calculated, and/or anticipated usage Some of this data may be obtained from sources outside of the admin network 124, such as the manufacturer's website. The admin database 126 may contain additional data received from the node network 106, such as temperature or weather data.

Functioning of the Interpretation Module 128 will now be explained with reference to FIG. 3.

Figure 3:
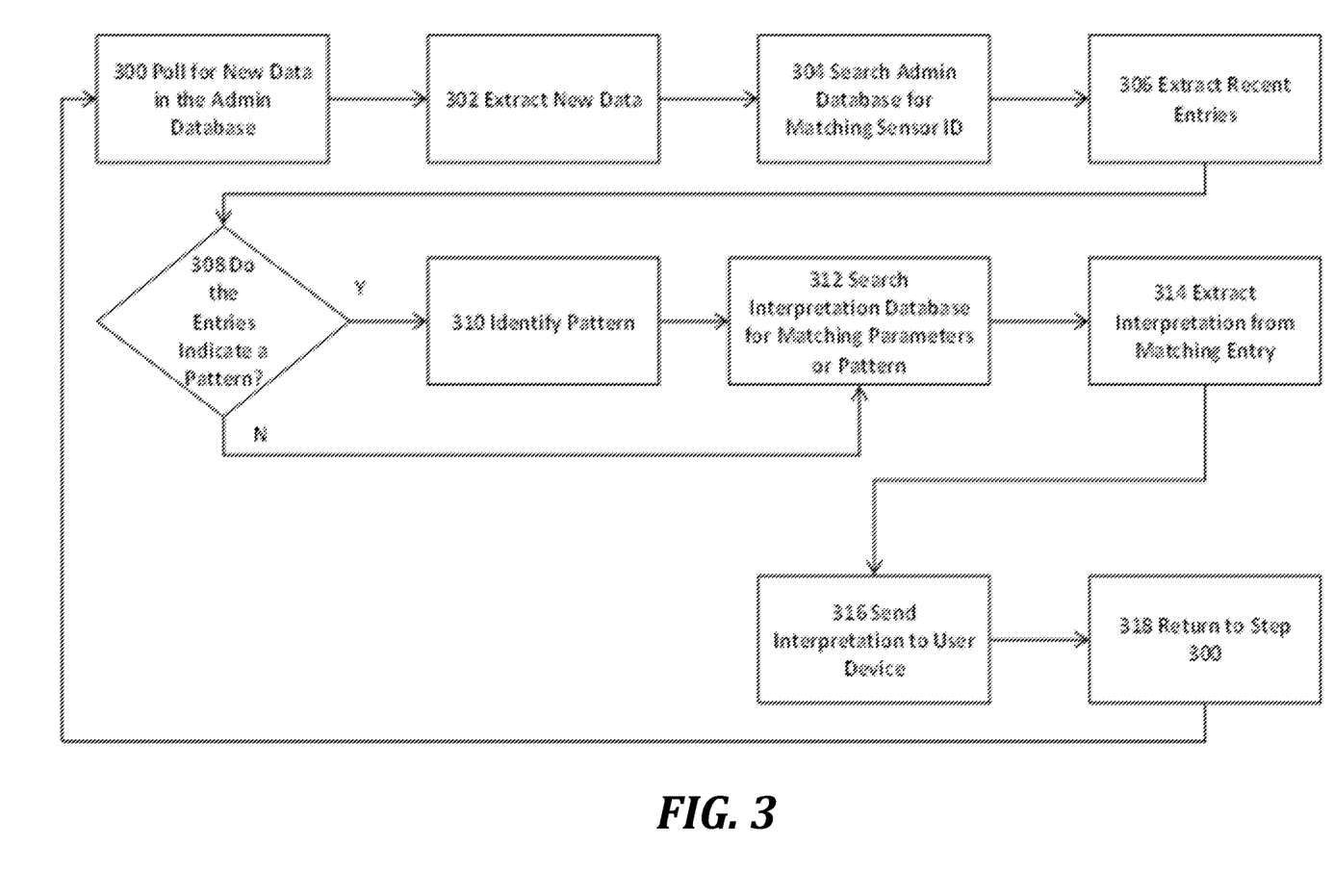
FIG. 3 illustrates an Interpretation Module, consistent with disclosed embodiments.

FIG. 3 shows the functioning of the Interpretation Module 128. The process may begin at step 300, with the interpretation module 128 polling for new data in the admin database 126. The new data may correspond to data that has just been received by the admin network 124 that originated at the sensor 104. In some embodiments, new data may refer to data that was newly created or updated. Additionally or alternatively, new data may correspond to the latest data in the admin database 126, which may include predictive data such as temperature, humidity, wind speed, etc., from a weather service.

At step 302, the interpretation module 128 may extract the new data from the admin database 126. The new data may include a sensor ID and the parameters received from the sensor 104, such as the state, color, and/or intensity of the indicator 102. The interpretation module 128 may search the admin database 126 for entries with a matching sensor ID to the extracted new data at step 304. Matching entries may be data from the same sensor 104 at an earlier time. At step 306, the interpretation module 128 may extract all matching entries within a specified time frame. The specified time frame for entries may be, by way of non-limiting example, one minute, five minutes, one hour, one day, etc. In embodiments, the specified time frame may be static or dynamic, and may be set by an administrator of the system, a user of the system, or another module.

At step 308, the interpretation module 128 may determine if the entries indicate a pattern, such as an indicator light blinking. This pattern may be detected by determining how long the indicator light is in the same state, such as on, off, red, green, etc., then checking if that same state is repeated at similar intervals. For example, over the last minute, there are 56 entries wherein the indicator light 102 is off and 4 entries wherein the indicator light 102 is on and green. If the 4 entries where the indicator light is on and green are each 15 seconds apart, the interpretation module 128 may determine that there is a pattern of one green blink every 15 seconds. If the 4 entries where the indicator light 102 is on and green are all at the end of the one-minute time window, then the interpretation module 128 may determine that the light has likely just turned on a few seconds ago and is not blinking. Pattern detection algorithms, which may involve machine learning or artificial intelligence, may be implemented to aid in determining whether certain changes correspond to a pattern.

If the interpretation module 128 determines that the retrieved data indicates a pattern (YES in step 308), the interpretation module 128 may identify the pattern in step 310. For example, an indicator light 102 switching on for a second every 15 seconds may be identified as the pattern "one blink every 15 seconds", whereas a light slowly changing color from red to green over 30 seconds may be "gradual color shift red/green every 30 seconds". These identifiers may be strings or some other variable that may identify a pattern. Pattern detection algorithms, which may involve machine learning or artificial intelligence, may be implemented to aid in identifying some patterns.

After identifying the pattern in step 310, or upon failure to detect a pattern (NO in step 308), the interpretation module 128 may search the interpretation database 130 for indicator light codes with matching parameters, patterns, or both, in step 312. For example, if the parameter for state is on and the parameter for color is red, that may match an indicator light code for a solid red light. But, if a pattern has been detected that is identified as "1 blink every 2 seconds," then the pattern and parameter combination will instead match an indicator light code for a red light that blinks once every 2 seconds. In some embodiments, a code may involve multiple indicator lights. For example, a code may require 3 separate indicator lights to be red and blinking. The interpretation module 128 may identify a particular code associated with the parameters and/or patterns.

At stage 314, the interpretation module 128 may extract an interpretation associated with the identified code from a matching entry in the interpretation database 130. The interpretation may be a string or other data, including data to be displayed to the user or used by the user device 120 to generate or retrieve data to be displayed. For example, the interpretation may be the string "Heat On," which may be directly displayed as is or may cause the user device 120 to display "Furnace is currently on and heating" and or a graphic indicating the furnace is on and heating. The interpretation module 128 may send the interpretation to the user device 120 at step 316. The interpretation module 128 may return to step 300, at step 318.

Functioning of the Interpretation Database will now be explained with reference to FIG. 4.

Figure 4:
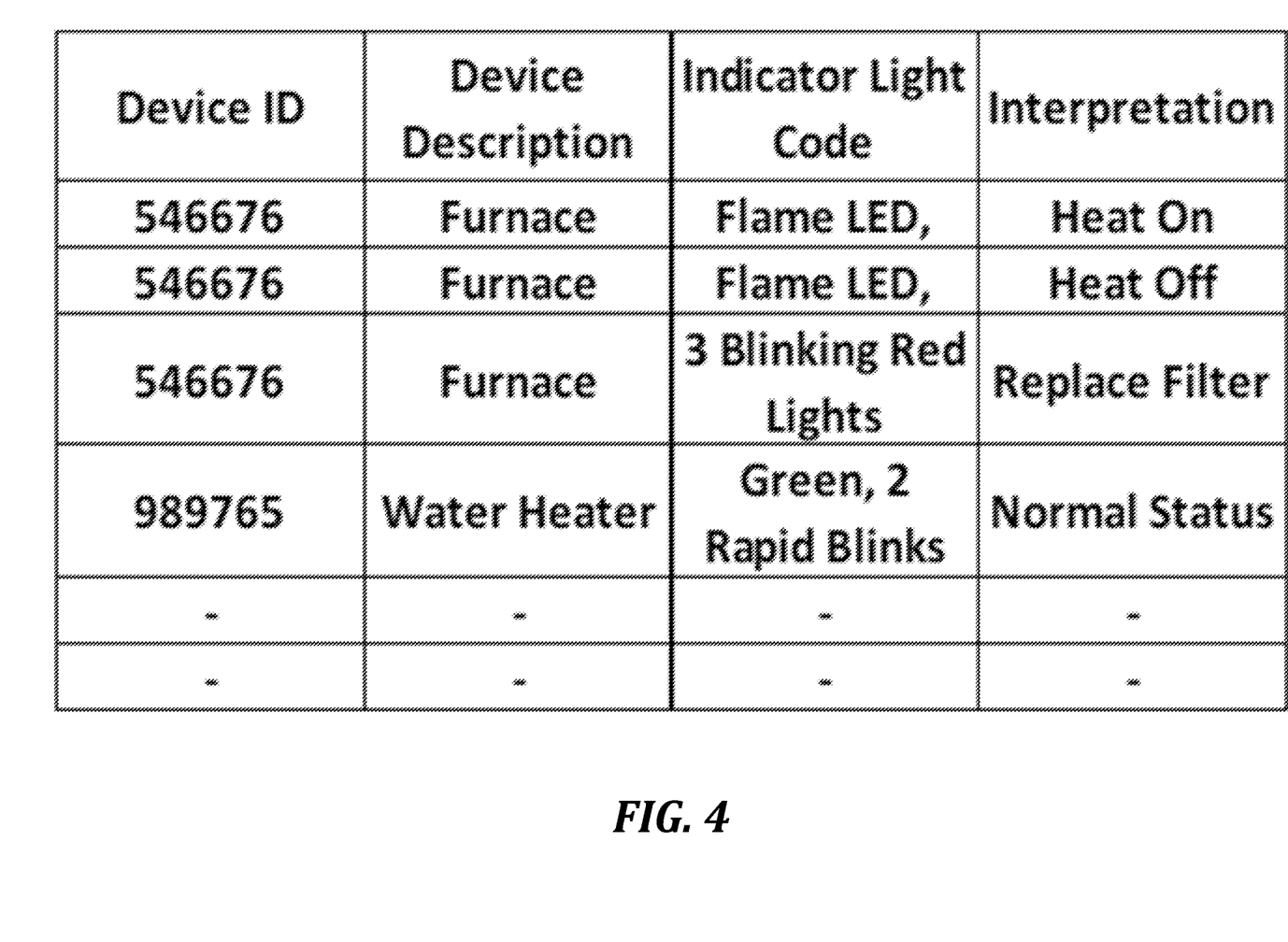
FIG. 4 illustrates an Interpretation Database, consistent with disclosed embodiments.

FIG. 4 shows an embodiment of the Interpretation Database 130. The interpretation database 130 may contain a device ID associated with a device with an indicator 102. The interpretation database 130 may contain an indicator code, which is a known set of parameters for the indicator 102 that indicate the device's status. As a non-limiting example for an indicator light, the color of the indicator light, if the light is on or off, if the light is blinking, how many blinks, how often it blinks, and/or other information associated with the indicator light may all be relevant to indicate the device's status. The interpretation database 130 may contain an interpretation of the indicator code such as "critical error." This interpretation may be a string or another variable sent to the user device 120, which may then display a more detailed notification.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A system for remote monitoring of an indicator mechanism for indicating a status of a device, comprising:
a processor of an interpretation module connected to a sensor node and to a user device over a remote network, wherein the sensor is selected from a group consisting of a photoelectric sensor, a camera, a microphone, and a sound sensor;
a memory storing machine-readable instructions that, when executed by the processor, cause the processor to:
acquire new data, via the sensor node, related to the indicator mechanism, wherein the indicator mechanism is selected from a group consisting of a visual indicator, an audio indicator, and a haptic indicator,
query an admin database for the new data acquired from the sensor node,
search the admin database for a sensor ID associated with the sensor node,
extract, from the admin database, recent entries corresponding to the sensor ID,
determine that the extracted entries indicate a pattern comprising a parameter,
responsive to a detection of the pattern, search an interpretation database for an entry including interpretation data associated with a status of the device, the indicator mechanism, and the pattern comprising the parameter, based on the indicator mechanism and the pattern comprising the parameter,
extract interpretation data from the entry comprising the pattern, and
provide the interpretation data to the user device.

2. The system of claim 1, wherein the instructions further cause the processor to identify the pattern by a pattern matching algorithm.

3. The system of claim 1, wherein the at least one sensor node is connected to the device, and wherein the indicator comprises one or more of:
a visual indicator,
an audio indicator, or
a haptic indicator.

4. The system of claim 1, wherein the interpretation data is created based on a machine learning process.

5. The system of claim 1, wherein a search of the interpretation database for the pattern comprises using a pattern detection algorithm based on machine learning.

6. The system of claim 1, wherein the interpretation module is connected to a temporary node connected to the sensor node and configured to repeat signals from the sensor node.

7. The system of claim 6, wherein the temporary node is directly connected to the user device running a device management application.

8. A method for remote monitoring of an indicator of a device, comprising:
acquiring new data, via a sensor node, related to the indicator,
querying, by an interpretation module, an admin database for the new data acquired from the sensor node,
searching, by the interpretation module, the admin database for a sensor ID associated with the sensor node,
extracting, from the admin database, recent entries corresponding to the sensor ID by the interpretation module,
determining, by the interpretation module, that the entries indicate a pattern comprising a parameter,
responsive to a detection of the pattern, searching an interpretation database for an entry including interpretation data associated with a status of the device, an indicator mechanism, and the pattern comprising the parameter, based on the indicator mechanism and the pattern comprising the parameter,
extracting, by the interpretation module, interpretation data from an entry comprising the pattern, and
providing the interpretation data to a user device.

9. The method of claim 8, further comprising identifying the pattern by a pattern matching algorithm.

10. The method of claim 8, wherein the sensor node is connected to the device, and wherein the indicator comprises one or more of:
a visual indicator,
an audio indicator, or a haptic indicator.

11. The method of claim 8, wherein the interpretation data is created based on a machine learning process.

12. The method of claim 8, wherein the searching of the interpretation database for the pattern comprises using a pattern detection algorithm based on machine learning.

13. The method of claim 8, wherein the interpretation module is connected to a temporary node connected to the sensor node and configured to repeat signals from the sensor node.

14. The method of claim 13, wherein the temporary node is directly connected to the user device running a device management application.

15. A non-transitory computer readable medium comprising instructions that, when executed by a processor, cause the processor to perform operations for remote monitoring of an indicator of a device, the operations comprising:
    acquiring new data, via a sensor node, related to the indicator;
    querying an admin database for the new data acquired from the sensor node;
    searching the admin database for a sensor ID associated with the sensor node;
    extracting, from the admin database, recent entries corresponding to the sensor ID;
    determining that the entries indicate a pattern comprising a parameter;
    responsive to a detection of the pattern, searching an interpretation database for an entry including interpretation data associated with a status of the device, an indicator mechanism, and the pattern comprising the parameter, based on the indicator mechanism and the pattern comprising the parameter;
    extracting interpretation data from an entry comprising the pattern; and
    providing the interpretation data to a user device.

16. The non-transitory computer readable medium of claim 15, further comprising instructions that, when executed by the processor, cause the processor to identify the pattern by a pattern matching algorithm.

17. The non-transitory computer readable medium of claim 15, wherein the interpretation data is created based on a machine learning process.

18. The non-transitory computer readable medium of claim 15, wherein the searching of the interpretation database for the pattern comprises using a pattern detection algorithm based on machine learning.

19. The non-transitory computer readable medium of claim 15, wherein an interpretation module comprising the processor is connected to a temporary node, which is in turn connected to the sensor node and configured to repeat signals from the sensor node.

20. The non-transitory computer readable medium of claim 19, wherein the temporary node is directly connected to the user device running a device management application.

* * * * *